US009566982B2

(12) United States Patent
Wilson (10) Patent No.: US 9,566,982 B2
(45) Date of Patent: *Feb. 14, 2017

(54) METHODS AND SYSTEMS FOR GENERATING A HORIZON FOR USE IN AN ADVANCED DRIVER ASSISTANCE SYSTEM (ADAS)

(71) Applicant: TomTom North America, Inc., Lebanon, NH (US)

(72) Inventor: Christopher Kenneth Hoover Wilson, Emerald Hills, CA (US)

(73) Assignee: TomTom North America, Inc., Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,630

(22) Filed: Feb. 15, 2016

(65) Prior Publication Data

US 2016/0159346 A1 Jun. 9, 2016

Related U.S. Application Data

(63) Continuation-in-part of application No. 13/709,112, filed on Dec. 10, 2012, now Pat. No. 9,299,023, which is a continuation-in-part of application No. 13/378,717, filed as application No. PCT/US2010/035694 on May 21, 2010.

(Continued)

(51) Int. Cl.
*B60W 30/095* (2012.01)
*B60T 7/12* (2006.01)
*G01C 21/26* (2006.01)
*B60W 50/00* (2006.01)
(Continued)

(52) U.S. Cl.
CPC .............. *B60W 30/095* (2013.01); *B60T 7/12* (2013.01); *B60W 40/10* (2013.01); *B60W 50/0097* (2013.01); *G01C 21/26* (2013.01); *G01C 21/32* (2013.01); *B60W 30/0953* (2013.01); *B60W 2550/14* (2013.01); *B60W 2550/402* (2013.01);
(Continued)

(58) Field of Classification Search
CPC ............ B60W 30/095; B60W 2550/14; B60W 2710/182; B60W 2720/10; B60T 7/12; G01C 21/26
USPC .......................................................... 701/36
See application file for complete search history.

(56) References Cited

U.S. PATENT DOCUMENTS 6,385,539 B1 5/2002 Wilson et al.
6,405,128 B1 6/2002 Bechtolsheim et al.
(Continued)

FOREIGN PATENT DOCUMENTS

DE 102004036825 A1 10/2005
DE 102005049133 A1 4/2007
(Continued)

OTHER PUBLICATIONS

"Electric Horizon—Supporting ADAS applications with predictive map data"—CeBIT in Motion—Forum for Telematics & Navigation. Hanover, Mar. 15, 2005. Ford Research & Advances Engineering, Christian Ress.
(Continued)

*Primary Examiner* — Richard Camby (57) ABSTRACT

A method and system of generating a horizon for use by an ADAS of a vehicle involving recording the historic movements of the vehicle on a road network, and using the recorded data to determine at least a most probable path that the vehicle will take at decision point of the road network.

20 Claims, 2 Drawing Sheets

Related U.S. Application Data (60) Provisional application No. 61/279,981, filed on Oct. 29, 2009, provisional application No. 61/273,185, filed on Aug. 3, 2009, provisional application No. 61/187,494, filed on Jun. 16, 2009.

(51) Int. Cl.
  *B60W 40/10*     (2012.01)
  *G01C 21/32*     (2006.01)

(52) U.S. Cl.
  CPC .... *B60W 2710/182* (2013.01); *B60W 2720/10* (2013.01); *Y02T 10/84* (2013.01)

(56) References Cited

U.S. PATENT DOCUMENTS

| | | |
|---|---|---|
| 6,615,130 B2 | 9/2003 | Myr |
| 6,735,515 B2 | 5/2004 | Bechtolsheim et al. |
| 7,197,500 B1 | 3/2007 | Israni et al. |
| 8,466,810 B2 | 6/2013 | Denaro |
| 8,660,734 B2 | 2/2014 | Zhu et al. |
| 8,918,278 B2 | 12/2014 | Feldman et al. |
| 2001/0029425 A1 | 10/2001 | Myr et al. |
| 2002/0161513 A1 | 10/2002 | Bechtolsheim et al. |
| 2006/0155464 A1 | 7/2006 | Smartt |
| 2008/0270018 A1 | 10/2008 | Citelli |
| 2009/0295598 A1 | 12/2009 | Denaro |
| 2013/0245941 A1 | 9/2013 | Staehlin et al. |
| 2013/0311047 A1 | 11/2013 | Denaro |
| 2014/0136045 A1 | 5/2014 | Zhu et al. |
| 2014/0142799 A1 | 5/2014 | Ferguson et al. |
| 2014/0185880 A1 | 7/2014 | Fairfield et al. |
| 2014/0277901 A1 | 9/2014 | Ferguson et al. |
| 2014/0280881 A1 | 9/2014 | Szamonek et al. |

FOREIGN PATENT DOCUMENTS

| | | |
|---|---|---|
| DE | 102008018163 A1 | 10/2008 |
| EP | 0933615 A1 | 8/1999 |
| EP | 1111336 A1 | 6/2001 |
| EP | 1111338 A2 | 6/2001 |

OTHER PUBLICATIONS

"ADASIS protocol for advances in-vehicle applications" Christian Ress—Ford Research & Advances Engineering.

"Architectures of Map-Supported ADAS" of Jun. 5, 2011—IEEE Intelligent Vehicles Symposium (IV).

"Maps & ADAS—How Digital maps can contribute to road safety"—Vincent Blervaque—XP-002720745—2006.

METHODS AND SYSTEMS FOR GENERATING A HORIZON FOR USE IN AN ADVANCED DRIVER ASSISTANCE SYSTEM (ADAS)

CROSS REFERENCE TO RELATED APPLICATIONS

This application is a continuation-in-part of U.S. Utility patent application Ser. No. 13/709,112 filed Dec. 10, 2012, which is a continuation-in-part of U.S. Utility patent application Ser. No. 13/378,717 filed Dec. 16, 2011, which is the national stage of International Patent Application No. PCT/US2010/035694 filed May 21, 2010, and which claims the benefit of three U.S. Provisional Patent Applications No. 61/279,981 filed Oct. 29, 2009, No. 61/273,185 filed Aug. 3, 2009 and No. 61/187,494 filed Jun. 16, 2009. The entire contents of all these applications are incorporated herein by reference.

FIELD OF THE INVENTION

The present invention relates to methods and systems for generating a horizon for use in an Advanced Driver Assistance System (ADAS) of a vehicle.

BACKGROUND TO THE INVENTION

Advanced Driver Assistance Systems are increasingly used in vehicles to provide assistance to drivers in areas such as braking, collision avoidance, and speed selection. Such systems may help to reduce driver workload, and may be useful in improving safety, vehicle operating efficiency, driver comfort and/or fuel efficiency.

Operation of an ADAS relies upon knowledge of the road ahead, and its properties. For example, the ADAS may take into account factors such as the curvature or gradient of a section of the road ahead in order to determine a suitable speed for traversing the section, and may then, for example, control the braking subsystems of the vehicle in order to implement the determined speed. Typically a subsystem of the ADAS, which may be known as an ADAS horizon provider subsystem, communicates with ADAS applications of a vehicle network over a vehicle bus, such as a Controller Area Network (CAN) bus, in order to control vehicle subsystems. Different ADAS applications may control different respective vehicle subsystems in accordance with the information received from the ADAS horizon provider over the vehicle bus. For example, there may be ADAS applications in respect of braking, suspension, etc. The ADAS horizon provider subsystem provides ADAS horizon information which may be used by the ADAS applications associated with given vehicle subsystems to provide control of the respective vehicle subsystems using the ADAS horizon data.

One aspect of the operation of the ADAS horizon provider subsystem relates to the generation of a suitable ADAS "horizon" for communication over the vehicle bus to the vehicle subsystems. The ADAS horizon comprises digital map information about a portion of the road network ahead, which is used by the ADAS applications to implement ADAS functionality with respect to the vehicle subsystems. Determination of the ADAS horizon involves predicting the path or paths that the vehicle may travel in the immediate future, to ensure that the necessary data is transmitted over the vehicle bus to allow implementation of ADAS functions by the vehicle subsystems as the vehicle travels.

The ADAS horizon may include information about the course of a road ahead, and associated attributes of the road, such as curvature, gradient, etc which may be used by ADAS applications of the vehicle to implement ADAS control of the vehicle subsystems. ADAS applications associated with different vehicle systems may filter the provided ADAS horizon data to extract the information required for controlling their relevant subsystem. For example, road curvature data may be extracted for use in controlling the braking system.

When determining a suitable portion of the road network ahead for inclusion in the ADAS horizon, it is necessary to balance providing sufficient data to ensure that ADAS functionality may be adequately implemented by vehicle systems while avoiding overloading the vehicle ADAS applications associated with the vehicle systems. The prediction of the path or paths that the vehicle may be expected to travel in the near future is therefore fundamental to the generation of a suitable ADAS horizon. The determination of a suitable ADAS horizon may involve certain challenges, for example depending upon whether the vehicle is following a pre-calculated route or not, and to accommodate potential deviations of a vehicle from a pre-calculated route. For example, in a simple case, the ADAS horizon may comprise data relating only to the road currently being traversed up to a predetermined distance from a current position. However, in such situations, the ADAS applications may be left "blind" for a time if the driver deviates from the road currently being traversed until a new ADAS horizon can be generated in relation to the newly traversed road section.

The Applicant has realised that there is a need for improved methods and systems for generating a horizon for use by an ADAS, and in particular, for predicting a path or paths that a vehicle may travel in the immediate future when generating an ADAS horizon.

SUMMARY OF THE INVENTION

In accordance with a first aspect of the invention there is provided a method of generating a horizon for use in an ADAS of a vehicle, comprising:

generating the horizon using positional data relating to the movement of a device associated with the vehicle or a plurality of devices associated with vehicles with respect to time.

In accordance with a second aspect of the invention there is provided a system for generating a horizon for use in an ADAS of a vehicle, the system comprising:

means for generating the horizon using positional data relating to the movement of a device associated with the vehicle or a plurality of devices associated with vehicles with respect to time.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the data indicative of the generated horizon, and/or the data used in determining the horizon. The means for generating the horizon may be a horizon generating subsystem of an ADAS system.

As used herein, the term "horizon" refers to a driving horizon for use by an ADAS of a vehicle. The horizon includes a prediction of one or more paths that the vehicle may travel in the immediate future through a portion of a road network or data enabling such a prediction to be made. The road network comprises a plurality of road segments connected by nodes and is represented by digital map data indicative of each road segment and node, i.e. decision point. In preferred embodiments the horizon comprises data indicative of the relative probability that each of a plurality of paths may be taken by the vehicle at a decision point. The horizon may comprise digital map data indicative of the or each predicted path and/or data indicative of one or more attributes of the or each predicted path. This may allow data about an upcoming portion of the road network to be obtained in advance before the vehicle reaches the relevant portion, to enable the ADAS to function. The portion of the road network may be defined by a boundary of the horizon.

By using positional data relating to the movement of devices associated with vehicles with respect to time in generating the horizon, it has been found that a useful horizon containing data necessary for appropriate guidance of the vehicle may be obtained. In particular, the use of such data has been found to allow the relative probability that each of a plurality of possible paths may be taken at a decision point to be more reliably determined. This may allow more accurate prediction of paths that may be taken by the vehicle to be made, resulting in more reliable operation of an ADAS system of the vehicle based on the ADAS horizon, even where the vehicle diverges from an expected most probable path. By using data relating to the previous movement of actual vehicles, and which may, in some preferred embodiments at least, be specific to a given time period and/or vehicle type, the probability that a given path will be taken may be established with greater confidence than by relying solely on theoretical determinations, e.g. based on digital map data relating to the attributes of road segments defining the paths. For example, such data may not be complete, or may not reflect the significance of given paths in reality.

The positional data used in generating the horizon is data relating to the movement of a plurality of devices associated with vehicles with respect to time. Such data may be referred to as vehicle "probe data", and any references to vehicle "probe data" herein, should be understood to refer to such positional data. As the devices are associated with respective vehicles, the position of the devices may be considered to correspond to the position of the vehicles. For brevity, the positional data relating to the movement of a plurality of devices associated with vehicles with respect to time may be referred to as the "positional data" herein.

The data that is used in generating the horizon is preferably obtained over a long period of time, e.g. weeks, months, etc (i.e. can be referred to as "historical data"). The positional data is preferably used in determining the relative probabilities associated with taking each possible outgoing path at a decision point as described in more detail below, but more generally may be used in predicting one or more possible paths in the horizon.

In accordance with a third aspect of the invention there is provided a computer implemented method of generating and using an electronic horizon for use with an advanced driver assistance system (ADAS) of a vehicle, comprising:

obtaining, by a processor, positional data relating to the movements of a device associated with a vehicle with respect to time on a road network;

using, by the processor, the positional data to record data indicative of the paths taken by the vehicle through a plurality of decision points of the road network in a memory;

using, by the processor, the recorded data for a decision point to generate the electronic horizon, wherein the electronic horizon defines at least a most probable outgoing path from the decision point to be taken by the vehicle when confronted with the decision point; and providing, by the processor, data to the ADAS of the vehicle determined using the electronic horizon to provide assistance to a driver of the vehicle.

In accordance with another aspect of the invention there is provided an apparatus for generating and using an electronic horizon for use with an advanced driver assistance system (ADAS) of a vehicle, comprising:

means for obtaining positional data relating to the movements of a device associated with a vehicle with respect to time on a road network;

means for using the positional data to record data indicative of the paths taken by the vehicle through a plurality of decision points of the road network in a memory;

means for using the recorded data for a decision point to generate the electronic horizon, wherein the electronic horizon defines at least a most probable outgoing path from the decision point to be taken by the vehicle when confronted with the decision point; and means for providing data to the ADAS of the vehicle determined using the electronic horizon to provide assistance to a driver of the vehicle.

The present invention in this further aspect may include any or all of the features described in relation to the third aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the data indicative of the generated horizon, and/or the data used in determining the horizon. The means for generating the horizon may be a horizon generating subsystem of an ADAS system.

By recording data indicative of the paths taken by the vehicle, and using the recorded data in generating the horizon, it has been found that a useful horizon containing data necessary for appropriate guidance of the vehicle may be obtained. In particular, the use of such data has been found to allow the relative probability that each of a plurality of possible paths may be taken at a decision point to be more reliably determined. For example, the step of using the recorded data for a decision point to generate the electronic horizon may comprise determining data indicative of a relative probability that each of a plurality of possible outgoing paths associated with the decision point will be taken by the vehicle using the recorded data for the decision point. This may allow more accurate prediction of paths that may be taken by the vehicle to be made, resulting in more reliable operation of an ADAS system of the vehicle based on the ADAS horizon.

The generated horizon may extend from a current position of a vehicle to a predetermined distance ahead of the current position defining a boundary of the horizon. The ADAS horizon may extend to the predetermined distance from the current vehicle position along the or each predicted path. The distance may be up to 500 m, or up to 200 m and/or at least 100 m. A given distance ahead of a current position refers to a distance in the current direction of travel. The extent of the horizon may be chosen as desired for a given application. The horizon may extend to a given radius corresponding to the distance in the direction of travel, e.g. through a 180 degree angle in the forward direction of travel.

As used herein, a "path" may comprise at least a portion of one or more road segments. A path is representative of a trajectory that may be taken by a vehicle through the road network. A path is a path defined by at least a portion of one or more road segments of a digital map. The digital map comprises a plurality of segments representative of road segments of a road network.

In accordance with the invention, the step of generating the horizon comprises predicting one or more paths that may be taken by the vehicle using the positional data or the recorded data. In preferred embodiments, the step of generating the horizon comprises determining data indicative of the relative probability that each of a plurality of possible outgoing paths associated with a decision point will be taken by the vehicle in the immediate future using the positional data.

It will be appreciated that the methods described herein in relation to a given decision point may be carried out in respect of any additional decision points of the road network as desired.

As used herein, the "relative probability" of a path of a set of a plurality of possible outgoing paths at a decision point being taken by a vehicle in the immediate future refers to the probability that the vehicle may be expected to take the path relative to the probability that the vehicle will take any of the other paths of the set of a plurality of possible outgoing paths at the decision point in the immediate future. References to a probable path or any other reference to probability or likelihood of a path should be understood to refer to the probability of the vehicle travelling along the path in the immediate future.

Preferably, for each respective possible outgoing path at the decision point, data is determined indicative of a relative probability that the path will be taken in preference to any other one of the possible outgoing paths. The method may comprise associating the relative probability data with data indicative of the path to which it relates and/or the decision point to which it relates.

It will be appreciated that the definition of an "outgoing" path, and indeed the relative probability that a given path will be taken, will depend upon the incoming path to the decision point. Accordingly the relative probability that each of the plurality of possible outgoing paths is taken is by reference to a given incoming path.

The method may comprise the step of determining an incoming path to the decision point with respect to which the outgoing paths are to be defined. The incoming path is a path along which the vehicle is expected to travel to reach the decision point. In preferred embodiments the incoming path is a continuation of a road segment along which the vehicle is currently travelling. Alternatively or additionally the path may be a portion of a known most probable path for the vehicle, such as a portion of a pre-calculated route. In these cases the portion of the known path is preferably an end portion of the known path which terminates at the decision point. However, these preferred embodiments of the invention may still be applied to determining the relative probability that each of a plurality of other paths may be taken at a decision point even where an outgoing path at the decision point corresponding to a portion of a pre-calculated route is known.

The decision point may be any decision point defining a plurality of possible outgoing paths for which it is desired to determine a relative probability associated with taking each of the possible paths. In embodiments the decision point is the next decision point to be encountered by the vehicle along a continuation of a currently traversed road segment. It may be assumed that the vehicle will continue along the currently traversed road segment at least until the next decision point is reached. Thus the path as far as the next decision point may be considered to be known.

In some embodiments the method comprises identifying a current location of the vehicle, determining a road segment along which the vehicle is currently travelling, and identifying the next decision point to be encountered. The method may then comprise determining the relative probability that each of a plurality of outgoing paths associated with the decision point will be taken in accordance with the methods of the invention.

It is envisaged that the preferred methods of determining the relative probabilities associated with paths at a decision point may be carried out on the fir. Thus, preferably the decision point is an upcoming decision point or next decision point to be encountered. Nonetheless, it is envisaged that the method could be carried out with respect to any decision point of a road network, or could be applied to determining relative probability values in advance that could be stored in association with data identifying each decision point to which they relate in a database or similar for subsequent use as desired. In this case, the incoming path with respect to which the outgoing path(s) are defined may be arbitrarily chosen, and data may be obtained for a given decision point in respect of multiple possible incoming paths.

In any of its embodiments, the method may comprise selecting a decision point, and determining an incoming path and a plurality of outgoing paths associated with the decision point for which relative probabilities are to be determined.

The decision point may be any type of decision point at which two or more possible outgoing paths exist for a given incoming path. The decision point may be any form of intersection, roundabout, junction, crossing, divergence of a path, etc.

The method preferably involves determining data indicative of a relative probability that each of a set of two or more possible outgoing paths will be taken by the vehicle at the decision point (for a given incoming path). Preferably the method comprises determining relative probability data in respect of every possible outgoing path present at the decision point in respect of the given incoming path. An outgoing path may be defined as any path originating from the decision point other than the incoming path. The possible outgoing paths may or may not include all potential outgoing paths associated with the decision point, and certain paths may be excluded from consideration for various reasons e.g. as they are considered to be in a direction close to that opposite to the direction of travel, are below a significance threshold, etc. For example, the path corresponding to the incoming path but in the opposite travel direction may not be considered for a junction, but may be considered for a roundabout. Such paths that are not considered are not deemed to be "possible" outgoing paths. Unless the context demands otherwise, references herein to an "outgoing path" should be understood to refer to a "possible outgoing path". The methods of the present invention are therefore carried out with respect to a set of a plurality of possible outgoing paths at the decision point. The set of the plurality of possible outgoing paths are those paths for which relative probability data is desired to be determined, i.e. which paths are considered relevant paths for a given application.

In some embodiments in which one of the possible outgoing paths at the decision point is known to correspond to a portion of a pre-calculated route, the method may comprise excluding that outgoing path from the set of plurality of outgoing paths whose relative probabilities are determined, or adjusting the calculations appropriately to ensure that this route is determined to be the most probable. This may be done by assigning the path corresponding to the route a probability of one and, for example, adjusting the probabilities of the other paths accordingly, or by adjusting the relative probabilities of the other paths such that none is higher than that of the path corresponding to the route.

The step of determining the data indicative of a relative probability that each possible outgoing path of a plurality of paths may be taken by the vehicle may comprise ranking each path according to the likelihood that the vehicle may be expected to travel along the path in preference to any other one of the paths of the set of a plurality of possible outgoing paths. Thus, the relative probability may be in terms of a qualitative ordering of the paths. In other embodiments the step may comprise determining a probability factor in respect of each possible outgoing path indicative of the relative probability that the path will be taken in preference to any other one of the paths. The probability factor provides a quantitative measure of the relative probability that the path will be taken.

The step of determining the data indicative of the relative probability that a given possible outgoing path may be taken is, in at least some embodiments, carried out using the positional data, e.g. historical vehicle probe data.

The step of determining the relative probability of a given possible outgoing path may further comprise using data indicative of the incoming path that the vehicle is expected to travel to reach the decision point.

The method may comprise storing the determined data indicative of the relative probability that each possible outgoing path will be taken. The stored data may be indicative of a rank or probability factor for the path. The method may comprise storing data indicative of a relative probability that the path will be taken in preference to any other one of the paths for each possible outgoing path in association with data identifying the path. The method may further comprise storing data indicative of the incoming path with respect to which the outgoing paths are defined. The method may comprise storing the data indicative of the relative probability of a possible outgoing path being taken in association with data indicative of the decision point to which it relates, e.g. the location of the decision point. The location of the decision point may be in absolute terms or in relation to a distance along an, for example, most probable path, etc.

Some preferred embodiments of the invention will now be described illustrating the way in which the positional data may be used in determining the data indicative of the relative probability of each possible outgoing path being taken. It will be appreciated that the probability of a path being taken will be with respect to a given incoming path as described above. Other types of data may additionally be used. For example, digital map data, vehicle data and/or driver data may additionally be used in combination with the positional data. A suitable probability function indicative of the relative probability of a path may be constructed to take account of any or all of these factors, and with an appropriate weight assigned to each as desired.

The method may comprise determining the relative probability data using data indicative of a historic relative probability that each of the plurality of possible outgoing paths from the decision point has been taken (in respect of the incoming path) based on the positional data i.e. historical probe data. The method may comprise associating a relatively higher probability with a possible outgoing path that is associated with a relatively higher probability of having been selected based on the historic probability data. The relative probability that the paths were chosen historically may be used alone, or as a weighting factor together with other factors to determine the relative probability that paths will be chosen.

The method may extend to determining the data indicative of the historic relative probability that each of the plurality of possible outgoing paths has been taken for the given incoming path. This may be carried out using the (historical) positional data relating to the movement of a plurality of devices associated with vehicles with respect to time in a portion of a road network comprising the decision point. The method may comprise using the positional data to determine a relative frequency with which vehicles have taken each of the plurality of possible outgoing paths from the decision point in respect of the incoming path. The historical probability data may be obtained using a count indicative of the number of times that each path is taken. In other embodiments the method may comprise obtaining the historic relative probability data from a database comprising data indicative of the frequency with which each of a plurality of possible outgoing paths has been taken at one or more, and preferably a plurality of, or each, decision points of a road network for one or more, and preferably a plurality of, or each, possible incoming path of the or each decision point.

The historical probability may be dependent upon time and/or vehicle type. Thus, multiple historical probabilities may be determined for a given outgoing path at a junction in respect of different time periods. The time periods may be times of day and/or week. For example, a count indicative of the number of times that a given path is taken by a device associated with a vehicle in a given time frame may be determined and used in determining the historic probability for the path that is applicable for the relevant time frame. Alternatively or additionally, a count may be determined in respect of different types of vehicle, e.g. car, lorry etc.

In some embodiments the historic relative probability data is indicative of the historic probability of each possible outgoing path having been taken during one or more time periods and/or by one or more types of vehicle. The relative probability that each outgoing path from the decision point will be taken may then be determined using the historic probability data for the time period appropriate for the time at which the horizon is generated and/or for the appropriate vehicle type.

The method may extend to obtaining the positional data. The step of obtaining the positional data may comprise receiving the data from devices associated vehicles, or may comprise accessing stored positional data. The method may thus comprise obtaining positional data relating to the movement of a plurality of devices associated with vehicles with respect to time in a road network, and filtering the data to obtain data relating to the travel of devices (and hence vehicles) along the or each of the plurality of possible outgoing paths from the decision point in respect of the given incoming path. The method may then comprise using the data to obtain the historic relative probability data. The data may be used in determining a count of the number of times each possible outgoing path is taken, and determining a relative probability that each outgoing path was taken for the given incoming path.

In some embodiments the method comprises generating and/or providing a probability matrix, the probability matrix comprising, in respect of each of one or more decision points of a road network, data indicative of the relative probability that each of a plurality of possible outgoing paths at the decision point will be taken by a vehicle for each of one or more possible incoming paths, wherein the data indicative of the relative probability that a given possible outgoing path will be taken is based upon historical data relating to the position of a plurality of devices associated with vehicles with respect to time. Preferably the matrix comprises data indicative of the relative probability of each possible outgoing path being taken at one or more, and preferably a plurality of, decision points for each possible incoming path at the decision point. The method may comprise using such a probability matrix in determining the relative probability data for the different outgoing paths. The data of the probability matrix may be time dependent and/or vehicle type dependent, and thus may be based on data relating to movements of devices associated with vehicles in a given time period and/or relating to devices associated with vehicles of a given type. Probability data may be determined for each of a plurality of different time periods and/or vehicles types.

The method may comprise storing such a probability matrix.

The present invention extends to a data product comprising such a probability matrix.

In accordance with a further aspect of the invention there is provided a data product comprising a probability matrix having, in respect of each of one or more decision points of a road network, data indicative of the relative probability that each of a plurality of possible outgoing paths at the decision point will be taken by a vehicle for each of one or more possible incoming paths, wherein the data indicative of the relative probability that a given possible outgoing path will be taken is based upon positional data relating to the movements of a plurality of devices associated with vehicles with respect to time.

The present invention in this further aspect may include any or all of the features described with reference to the other aspects of the invention to the extent they are not mutually exclusive.

In accordance with the invention in any of its aspects or embodiments involving a probability matrix, the step of providing the probability matrix may comprise obtaining positional data relating to the position of a plurality of devices associated with vehicles with respect to time in a road network, and filtering the positional data to obtain data indicative of the travel of vehicles along each possible outgoing path at the or each decision point of the road network, and with respect to the or each incoming path at the or each decision point. The filtered data may then be used to determine the relative probability that each of the plurality of paths at a decision point is taken. The data may be filtered according to time period and/or vehicle type.

In accordance with any embodiment using positional data, the method may extend to the step of obtaining the positional data relating to the movement of devices associated with vehicles. The step of obtaining the positional data may or may not comprise receiving the data from the one or more devices. In some arrangements the step of obtaining the data may comprise accessing the data, i.e. the data being previously received and stored. In arrangements in which the step of receiving the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

In embodiments the positional data is received at a central controller, such as a server system. The server may carry out the steps of using the positional data to determine a relative probability that each of a plurality of paths will be taken, or to determine the probability matrix.

The positional data used in accordance with the invention, at least in preferred embodiments, is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the data relating to the probability of different paths being taken in accordance with the present invention. However, in preferred embodiments all positional data is associated with temporal data, e.g. a timestamp.

The devices are associated with vehicles. The position of a device can be assumed to correspond to the position of a vehicle. Thus references to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, e.g. in-built sensor or navigation apparatus, or may be a separate device associated with the vehicle, such as a portable navigation apparatus. Of course, the positional data may be obtained from a combination of different devices, or a single type of device, e.g. devices associated with vehicles.

The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

In accordance with the invention in any of its aspects or embodiments involving recording data indicative of the paths taken by a vehicle through a plurality of decision points of the road network, and using the recorded data to generate the electronic horizon, the step of using the recorded data for a decision point to generate the electronic horizon may comprises determining data indicative of a relative probability that each of a plurality of possible outgoing paths associated with the decision point will be taken by the vehicle using the recorded data for the decision point. A relatively higher probability of the path being taken may be associated with a possible outgoing path that is associated with a relatively higher probability of having been selected based on the recorded data for the decision point.

The steps of the methods described herein in any of its embodiments for generating a horizon are preferably carried out by a horizon generating subsystem of an ADAS. The ADAS is associated with a vehicle. The horizon generating subsystem may be provided by a suitable software module or modules, for example. The horizon generating subsystem is preferably in communication with one or more ADAS applications of a vehicle over a vehicle communication network, e.g. CAN bus.

A horizon generating subsystem may comprise means for storing data used in generating the horizon, or such data may be stored separately to the horizon generating subsystem. Similarly horizon data, e.g. probability data, may be stored by a memory of the horizon generating subsystem or elsewhere.

Preferably the data used in generating the horizon, or, where determined, probability data is stored locally to the vehicle, e.g. on a memory of the ADAS.

The method may further comprise the step of using the determined horizon data, e.g. relative probability data for a plurality of outgoing paths associated with a decision point, to determine one or more predicted paths along which the vehicle can be expected to travel in the immediate future, e.g. one or both of a most probable path and at least one alternative path. The at least one alternative path preferably comprises at least a most probable alternative path. The method may comprise storing data indicative of the or each determined path. The one or more of the most probable outgoing path and the at least one alternative path are preferably outgoing paths at the decision point.

The step of generating the horizon may comprise determining a most probable path the vehicle may be expected to travel in the immediate future, and at least one alternative path, wherein the positional data is used in determining the most probable path and/or the at least one alternative path.

In preferred embodiments in which relative probability data is determined for following each of a plurality of different possible outgoing paths at a decision point, the method may comprise determining a most probable outgoing path based on the probability data to be travelled by the vehicle from the decision point and/or determining the relative probabilities associated with one or more, and preferably a plurality of, alternative outgoing paths at the decision point using the probability data.

The methods and systems of the present invention are applicable whether or not the vehicle is following a pre-calculated route. In some embodiments the vehicle is a vehicle that is following a pre-calculated route, while in other embodiments the vehicle is a vehicle that is not following a pre-calculated route. In the latter case, the vehicle will be so-called "free driving".

The most probable outgoing path based on the relative probability data may be taken to be the most probable path to be travelled by the vehicle in embodiments in which the vehicle is not following a pre-calculated route.

As used herein, a "pre-calculated route" refers to a route that has been calculated between an origin and a destination. The route may be a route that has been pre-calculated by a navigation device associated with the vehicle. The navigation device may be an integrated or portable navigation device. The pre-calculated route is, in these embodiments, a route that has been calculated before the step of generating the ADAS horizon takes place. The method may further comprise the step of calculating a route that is to be followed by the vehicle between an origin and a destination prior to the step of generating the ADAS horizon, and the system may comprise means for calculating a route. The route may be pre-calculated before the vehicle commences travel, or may be a route that is calculated en-route, e.g. in the event of a deviation from an originally planned route. The method may comprise generating the ADAS horizon during travel of the vehicle along the pre-calculated route.

When the vehicle is following a pre-calculated route, the most probable path may be assumed to correspond to a portion of the pre-calculated route ahead. Thus, in embodiments in which the vehicle is following a pre-calculated route, the most probable path, and hence in embodiments the most probable outgoing path at the decision point, is assumed to correspond to the pre-calculated route, or the outgoing path corresponding to a portion thereof. This may or may not be the same as the most probable path indicated in preferred embodiments by the relative probabilities determined using the positional data In some embodiments in which one of the possible outgoing paths is known to correspond to a portion of a pre-calculated route, the method may comprise excluding that outgoing path from the set of plurality of outgoing paths whose relative probabilities are determined, or adjusting the calculations appropriately to ensure that this route is determined to be the most probable, as described above.

Where an outgoing path corresponds to a pre-calculated route, the method of the present invention in its preferred embodiments may be used to determine the relative probabilities that each of a plurality of outgoing paths other than that corresponding to the pre-calculated route will be taken at the decision point. These paths will provide alternative paths diverging from the pre-calculated route at the decision point. The present invention may then provide the ability to determine the relative probability that the vehicle will follow any of these alternative paths if the path of the vehicle diverges from the most probable path, i.e. that corresponding to the pre-calculated route at the decision point.

Determining of an alternative path emanating from a decision point as well as the most probable path is advantageous as the alternative path may be taken to be the most likely path to be taken if the vehicle diverges from the most probable (main) path. By including data indicative of the probability that different alternative paths may be taken at the decision point in the horizon, the ADAS may be able to continue to operate, and obtain data relating to the path, if the vehicle deviates from the expected main path, reducing the likelihood of "blind driving".

The method preferably comprises providing storing data indicative of the generated horizon and/or providing data indicative of the generated horizon over a vehicle bus to one or more ADAS applications of the vehicle (e.g. to the client side of the vehicle ADAS). Preferably these steps are carried out by a horizon generating subsystem of the ADAS.

The ADAS applications are for controlling respective subsystems of the vehicle. The one or more ADAS applications may be arranged for controlling one or more of: a braking function, the suspension, and the speed selection subsystem of the vehicle.

In embodiments in which the step of generating the horizon comprises determining one or more predicted paths, e.g. one or both of a most probable path and an alternative path, the method may comprise storing data indicative of the or each path and/or providing, e.g. transmitting such data over a vehicle bus to one or more ADAS applications of the vehicle for use by the one or more applications.

In embodiments in which data indicative of one or more predicted path is stored and/or provided over the bus, the data may comprise one or more attributes of the path, or data allowing such attributes to be determined. The attribute data may comprise, as needed, information identifying a location associated with the one or more attributes. For example, the attribute data may indicate the start and end of a portion of a road segment with high curvature.

Attribute data in respect of a path of a horizon refers to properties of the predicted path ahead of a vehicle's current position, and may include any or all of: a gradient of a segment, a curvature of a segment, a height of a segment, geometry of a segment, and a speed profile associated with the segment. Thus the attribute data may reflect inherent properties of the segment, or for example relate to expected vehicle speed data along the segment. The attribute data may be any attribute data that may be used by one or more ADAS application to implement one or more ADAS function. Thus, in some embodiments, the method may further comprise an ADAS application of the vehicle using the attribute data transmitted over the vehicle bus to carry out one or more of: issuing a speed warning, providing a speed recommendation, and automatically controlling the braking function of the vehicle.

Preferably such attribute data is provided at least in respect of a determined most probable path, and in some instances only for the most probable path. In these latter embodiments preferably data indicating the presence and/or location of one or more alternative paths along the most probably path is provided over the bus. The data indicative of the presence of the one or more alternative paths preferably comprises data indicative of the relative probability that the path will be taken at the decision point determined in accordance with the invention. In preferred embodiments relative probability data is provided for each alternative path for which relative probability data has been determined. In these embodiments, the ADAS applications would use the indication of the presence of an alternative path to request further data, e.g. attribute data, from the horizon generator when the vehicle is found to diverge from a most probable route.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments of the present invention will now be described, by way of example only, and with reference to the accompanying drawings in which.

DETAILED DESCRIPTION OF THE FIGURES

Figure 1:
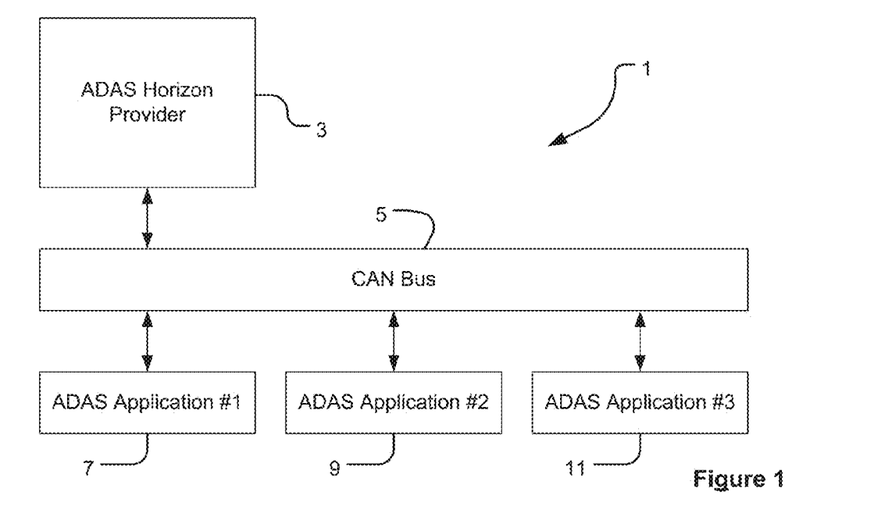
FIG. 1 shows the components of an exemplary ADAS system associated with a vehicle, which may be used to implement the methods of the present invention.

FIG. 1 is a schematic illustration of the components of an exemplary ADAS system associated with a vehicle, which may be used to implement the methods of the present invention.

The ADAS system 1 includes a horizon generating subsystem 3, which communicates horizon data over a Controller Area Network (CAN) bus 5 to a plurality of ADAS applications 7, 9 and 11. The ADAS applications are arranged to implement ADAS functionality in controlling respective subsystems of the vehicle. For example, the ADAS applications may be for controlling braking, speed selection and suspension vehicle subsystems respectively. In use, the respective ADAS applications filter the relevant data from the horizon data for use in controlling their associated vehicle subsystem.

The horizon providing subsystem 3 is arranged to generate data indicative of a driving horizon which is used by the ADAS applications (the "ADAS horizon"). The ADAS horizon is an electronic horizon comprising data indicative of one or more predicted paths ahead of a current position of a vehicle that it may be expected the vehicle will travel along. The ADAS horizon is based on digital map data.

In order to provide ADAS functions, the ADAS applications require information about the road ahead, and its attributes, e.g. gradient, curvature, speed limit, etc. The ADAS horizon provides this information in respect of the one or more predicted paths up to a given distance ahead of the current position. The distance ahead may be 200 m. The ADAS horizon data that is transmitted over the vehicle bus 5 to the ADAS applications contains at least attribute data of the most probable path (up to a certain, often predetermined, extent ahead of the vehicle). The ADAS horizon generating subsystem 3 provides the attribute data in relation to any attributes that may be required by the different ADAS applications 7, 9, 11, or data allowing such attribute data to be requested by the applications, and the respective subsystems may then select or request the attribute data relevant to their operation. For example, data relating to the curvature of the path ahead may be selected by an ADAS application for controlling braking of the vehicle. The attribute data may be provided in fields to facilitate filtering of relevant data by the ADAS applications.

The horizon generating subsystem 3 is arranged to determine a horizon in accordance with any of the embodiments described herein, and to cause the horizon data to be transmitted over the vehicle bus to the ADAS applications. The horizon generating subsystem 3 may be arranged to be in communication with a memory for storing generated horizon data. It will be appreciated that as described below, not all horizon data determined is necessarily transmitted at a given time over the vehicle bus. For example, data relating to alternative paths rather than a determined most probable path may be determined and stored, but not transmitted over the bus unless required to avoid overloading the ADAS applications. The ADAS horizon generating subsystem is also in communication with digital map data. This is used in determining the horizon. In some arrangements the ADAS horizon generating subsystem may be implemented using a software module separate from a digital map data store, or may otherwise include means storing such data. Thus the digital map data providing and horizon generating functions may be implemented separately or as part of a combined system.

Figure 2:
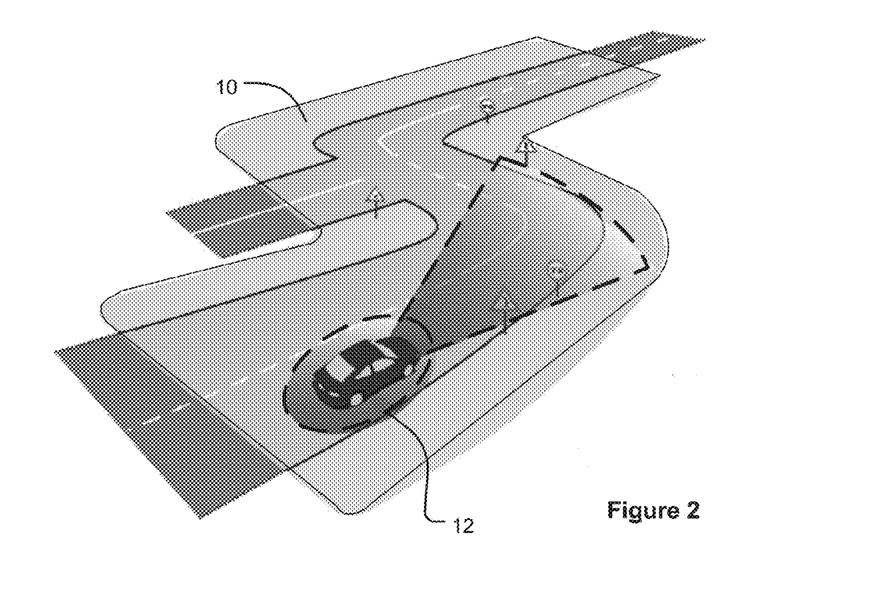
FIG. 2 schematically illustrates the concept of an ADAS horizon.

FIG. 2 schematically illustrates the concept of an ADAS horizon. It may be seen that the electronic ADAS horizon 10 provides the ADAS with information about the path ahead in a similar manner to a vehicle sensor horizon 12, but may provide information about the path beyond the limit of a vehicle sensor horizon, e.g. around a corner, and regardless of weather conditions, as the ADAS horizon is based upon digital map data.

At various points in a road network there will be nodes, i.e. decision points at which the vehicle may have a choice of possible outgoing paths. The present invention relates, in embodiments at least, to a method of more reliably determining the most probable path at a decision point, and the relative probability that each of a plurality of alternative paths may be taken. Some exemplary methods will be described by reference to a decision point that is a junction.

At a given time, a vehicle has a current position defined on a particular road segment. It may be assumed that the continuation of the segment forms the most probable path until the first junction is reached. At the first junction the method of the present invention may be used to determine the relative probability that each of the possible outgoing paths may be taken. This enables a determination to be made as to which of the plurality of outgoing paths forms the continuation of the main path, if this is not already known (e.g. from a pre-calculated route), and which form alternative paths. A determination is also made as to the relative likelihood that one of these alternative paths may be taken.

In order to determine this, a probability is determined for each outgoing path at a decision point indicative of the likelihood that the path will be chosen in preference of all other possible outgoing paths. In this process, certain outgoing paths which are considered not to be possible outgoing paths may be excluded from the determination, e.g. they may be designated "restricted" paths. These may be excluded by assigning each a probability of "0".

The way in which the probability for each outgoing path is determined is dependent upon whether the vehicle is following a pre-calculated route.

Where no route has been pre-calculated, a probability is determined for each outgoing path at a decision point indicative of the likelihood that the path will be taken to the detriment of all other outgoing paths. This is done using the probability matrix described below. The most probable path may be determined as the most probable path continuing from the decision point. Each other outgoing path may then be classified as an alternative path.

Data is stored indicative of the identity and probability associated with the determined most probable path and each alternative path. This data is associated with data indicative of the junction to which it relates.

When a route is pre-calculated, it may be assumed that the most probable outgoing path at the decision point is the outgoing path from the junction which is along the pre-calculated route. This may override any restriction of the path. The remaining non-restricted outgoing paths are determined to be alternative paths.

Data is stored indicative of the identity and probability of each alternative path associated with data indicative of the junction to which this relates.

The probability that a given possible outgoing path from the junction will be taken is calculated, in a first set of embodiments, based on a historical probability that the path has been taken determined using vehicle probe data (collected over a relatively long period of time, e.g. weeks, months, etc), i.e. positional data with respect to time. Such data may be referred to as "historical probe data". The vehicle probe data may be obtained from any suitable devices associated with the vehicles, such as ADAS, navigation devices, or any other suitable electronic device.

Vehicle data is used to build up a probability matrix in respect of paths being taken at each of a plurality of junctions in the road network. Probe data relating to the movement of vehicles in the network is filtered to extract data relating to paths taken by vehicles passing through each junction. The probe data comprises a set of data including, for each vehicle, data indicative of a plurality of positions and associated timestamps representing the movement of the vehicle, i.e. a positional or probe trace. The probe data relating to vehicles that have traversed a given junction may readily be selected by reference to digital map data identifying the location of the junction. The data is used to determine a count of vehicles that have taken each possible outgoing path at the junction for each possible incoming path. This may include U turn manoeuvres. The set of possible incoming paths and the set of possible outgoing paths at each junction may be represented by respective incoming and outgoing vectors. For example, each positional trace may be assigned to a bin depending upon the incoming and outgoing paths used. There may be a bin for each combination of an outgoing and incoming path at the junction. From this data, a probability matrix defining a probability of each possible outgoing path being taken for each possible incoming path at the junction is derived. The probability data determined for a junction provides a probability matrix for the junction that may be stored in a suitable database. The relevant probability data is stored in the database in association with data identifying the junction to which it relates. A probability matrix may be determined for each junction in the region.

When the vehicle approaches a given junction, the relevant data may be obtained from the database representing the (historic) probability that each outgoing path may be taken based on the current incoming path. In this way, these probabilities for each outgoing path based on historical probe data may be used in determining the probability associated with each outgoing path.

In preferred embodiments the probability matrix data relating to the probability of each possible outgoing path at a given junction being taken for each possible given incoming path is time dependent. In these embodiments, probability data may be determined and stored in respect of each of a plurality of different time periods. The time periods may be times of day. This may be done by reference to probe data relating to movements of vehicles only in the time period of interest. In these preferred embodiments, when a vehicle approaches a given junction, the historic probability data that is derived from the database is that for the corresponding time of day. Alternatively or additionally, the probability matrix data may be dependent upon vehicle type, e.g. lorry, car etc. The data relating to the type of vehicle that is approaching the junction may then be used to determine the probability of the vehicle taking a given outgoing path.

The probability that a given possible outgoing path from the junction will be taken is calculated, in a second set of embodiments, based on paths that have been taken by a vehicle in the past. The historic behaviour of the device and/or driver being used as an indicator of the paths that may be taken by the same device and/or driver at a future time.

Positional data relating to the movements of a device associated with the vehicle with respect to time on a road network. The positional data may comprise data indicative of a plurality of positions and associated timestamps representing the movement of the vehicle, i.e. a positional or probe trace, e.g. as obtained from a navigation satellite system associated with the device and/or vehicle. The positional data is used to record data indicative of the paths taken by the vehicle through a plurality of decision points of the road network. The recorded data is stored in a memory When the vehicle approaches a given junction, the relevant recorded data may be obtained from the memory to indicate if the vehicle always takes a certain outgoing path from the junction, or if historically one outgoing path is favoured above another outgoing path. In this way, the recorded data may be used in determining the probability associated with each outgoing path.

In accordance with the invention, probabilities associated with a most probable path and multiple alternative outgoing paths emanating from the junction are determined by the horizon generating subsystem. The horizon generating subsystem stores data indicative of each path and its probability.

Once determined, the horizon generating subsystem may then provide data indicative of each path and its associated probability over a vehicle bus to the one or more subsystems. There are various manners in which this may be done.

It is desirable to reduce the amount of horizon data transmitted over the CAN bus. For this reason, in certain embodiments, only attribute data for the most probable path is transmitted over the vehicle bus, together with data identifying the location of any such attributes, e.g. relative to the current position of the vehicle. The most probable path may be referred to as the "main path". This is the most probable future trajectory of the vehicle up to the limit of the ADAS horizon, as determined by the ADAS horizon providing subsystem 3.

At each decision point along the main path there will be a possible alternative path that the vehicle may take if it diverges from the main path. An alternative path that emanates from a decision point along the main path may be referred to as a first level sub path beneath the main path. A path branching off from the first level sub path is referred to as a second level sub path and so on. This concept is illustrated by reference to FIGS. 3A, 3B and 3C.

Figure 3A:
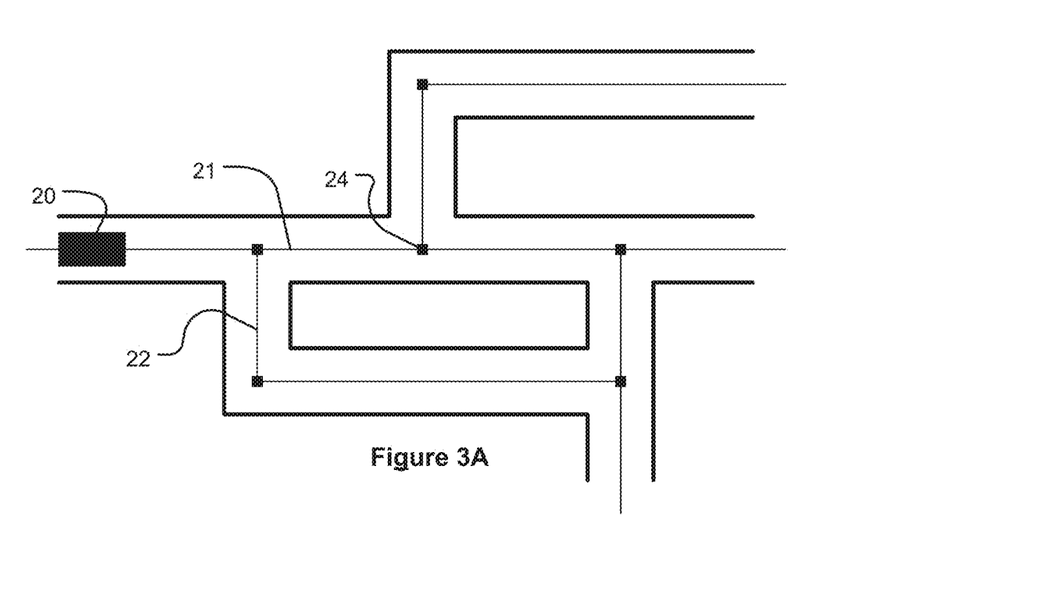
FIG. 3A illustrates a portion of a road network ahead of a current position of a vehicle up to a distance in the direction of travel defined by a limit of the distance that the ADAS horizon will extend once generated.

FIG. 3A illustrates a portion of a road network ahead of a current position 20 of a vehicle up to a distance in the direction of travel defined by a limit of the distance that the ADAS horizon will extend once generated, e.g. 200 m. The road network is made up of a plurality of links or road segments, e.g. 21, 22, connected by nodes e.g. 24. The generation of the ADAS horizon considers possible paths, i.e. trajectories, that may be taken by the vehicle through the road network rather than individual road segments and nodes.

Figure 3B:
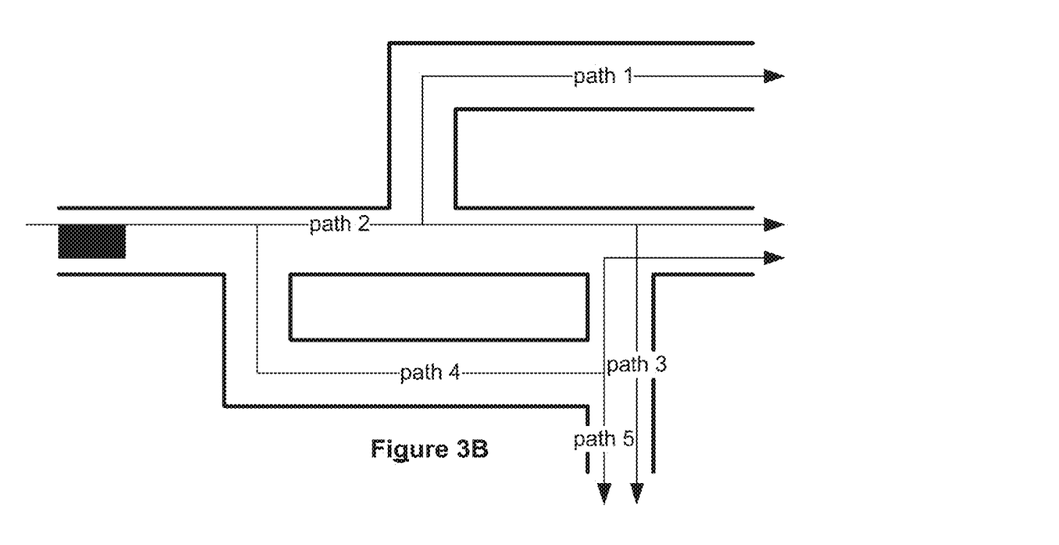
FIG. 3B illustrates a number of paths which may be taken through the network.

FIG. 3B illustrates a number of paths which may be taken through the network shown in FIG. 3A. Each of the paths has a probability that the driver will follow it. This may be used to determine the most probable or main path that can be expected to be followed, and in many cases at least a first level sub path. The first level sub path may be considered to be an alternative path that may be taken at a given decision point along the main path.

Figure 3C:
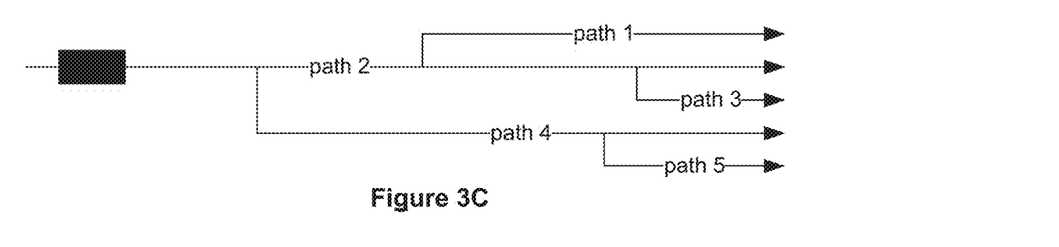
FIG. 3C illustrates the way in which these paths may be represented to an ADAS application.

FIG. 3C illustrates the way in which these paths may be represented to an ADAS application. This represents schematically the relationship between the possible paths through the road network. Path 2 forms the most probable or main path in this case, and paths 1, 3 and 4 are first level sub paths diverging from the main path at different respective decision points along its length. Path 5 is a second level sub paths diverging from the first level sub paths 4 at a decision point along its length.

The ADAS horizon generating subsystem 3 will determine the most probable, i.e. main path 2. As discussed above, in some simple systems, the ADAS horizon generating subsystem could just transmit attribute data for this main path over the vehicle bus. However, if the vehicle diverges from the main path, then the system will be left "blind" until a new most probable or main path is generated. Thus, it is beneficial for the horizon generating subsystem 3 to also determine at least the first order sub paths diverging from the main path.

Where one or more first level sub paths are determined, the horizon generating subsystem 3 may provide attribute data for the or each first level sub path over the vehicle bus to the ADAS applications, together with the corresponding data for the main or most probable path. However, to reduce the amount of data transmitted, in some arrangements only minimal data is transmitted regarding the presence of a first level sub path and its location along the main path.

When a most probable and one or more alternative paths at a decision point is determined in accordance with the invention, the horizon provider may represent the determined paths in any of these manners to the ADAS applications. Each alternative outgoing path at the decision point, e.g. junction may be represented as a first level sub path emanating from the main or most probable path at the junction.

The data transmitted regarding the main path, and in some embodiments one or more alternative paths, may include any of the following data about attributes of the road segment or segments making up the determined portion of the main path: speed limit, recommended speed limit where no legal speed limit is associated with the road segment, functional road class, form of way, gradient, curvature, etc.

The data may be used by the ADAS applications as desired. In preferred embodiments the received horizon data is used to carry out at least one of: providing an over-speed warning, adjusting a current speed, or operating a braking subsystem of the vehicle. The ADAS applications may control speed based on a curvature, gradient or speed limit associated with the most probable or main path.

Although the present invention has been described with reference to preferred embodiments, it will be understood by those skilled in the art that various changes in form and detail may be made without departing from the scope of the invention as set forth in the accompanying claims.

The invention claimed is:

1. A computer implemented method of generating and using an electronic horizon for use with an advanced driver assistance system (ADAS) of a vehicle, comprising:
   obtaining, by a processor, positional data relating to the movements of a device associated with a vehicle with respect to time on a road network;
   using, by the processor, the positional data to record data indicative of the paths taken by the vehicle through a plurality of decision points of the road network in a memory;
   using, by the processor, the recorded data for a decision point to generate the electronic horizon, wherein the electronic horizon defines at least a most probable outgoing path from the decision point to be taken by the vehicle when confronted with the decision point; and
   providing, by the processor, data to the ADAS of the vehicle determined using the electronic horizon to provide assistance to a driver of the vehicle.

2. The method of claim 1, wherein the step of using the recorded data for a decision point to generate the electronic horizon comprises determining data indicative of a relative probability that each of a plurality of possible outgoing paths associated with the decision point will be taken by the vehicle using the recorded data for the decision point.

3. The method of claim 2, wherein the method comprises associating a relatively higher probability of the path being taken with a possible outgoing path that is associated with a relatively higher probability of having been selected based on the recorded data for the decision point.

4. The method of claim 2, further comprising storing the determined data indicative of the relative probability that each possible outgoing path will be taken, in association with at least one of: data indicative of the path to which the probability data relates; and the decision point to which it relates.

5. The method of claim 1, wherein the electronic horizon defines the most probably outgoing path and at least one alternative outgoing path to be taken by the vehicle when confronted with the decision point.

6. The method of claim 1, wherein the step of generating the electronic horizon is carried out by a horizon generating subsystem of the ADAS associated with the vehicle, the method further comprising the horizon generating subsystem providing the data determined using the generated electronic horizon over a vehicle bus to one or more ADAS applications of the vehicle for use by one or more ADAS applications in controlling one or more vehicle subsystems of the vehicle.

7. The method of claim 6, wherein the one or more ADAS applications use the data provided over the vehicle bus to carry out one or more of: issuing a speed warning, providing a speed recommendation, and automatically controlling the braking function of the vehicle.

8. A non-transitory computer-readable medium comprising computer readable instructions executable to perform a method of generating and using an electronic horizon for use with an advanced driver assistance system (ADAS) of a vehicle, the method executed by the set of instructions comprising:
   obtaining, by a processor, positional data relating to the movements of a device associated with a vehicle with respect to time on a road network;
   using, by the processor, the positional data to record data indicative of the paths taken by the vehicle through a plurality of decision points of the road network in a memory;
   using, by the processor, the recorded data for a decision point to generate the electronic horizon, wherein the electronic horizon defines at least a most probable outgoing path from the decision point to be taken by the vehicle when confronted with the decision point; and
   providing, by the processor, data to the ADAS of the vehicle determined using the electronic horizon to provide assistance to a driver of the vehicle.

9. The computer-readable medium of claim 8, wherein the step of using the recorded data for a decision point to generate the electronic horizon comprises determining data indicative of a relative probability that each of a plurality of possible outgoing paths associated with the decision point will be taken by the vehicle using the recorded data for the decision point.

10. The computer-readable medium of claim 9, wherein the method comprises associating a relatively higher probability of the path being taken with a possible outgoing path that is associated with a relatively higher probability of having been selected based on the recorded data for the decision point.

11. The computer-readable medium of claim 9, further comprising storing the determined data indicative of the relative probability that each possible outgoing path will be taken, in association with at least one of: data indicative of the path to which the probability data relates; and the decision point to which it relates.

12. The computer-readable medium of claim 8, wherein the electronic horizon defines the most probably outgoing path and at least one alternative outgoing path to be taken by the vehicle when confronted with the decision point.

13. The computer-readable medium of claim 8, wherein the step of generating the electronic horizon is carried out by a horizon generating subsystem of the ADAS associated with the vehicle, the method further comprising the horizon generating subsystem providing the data determined using the generated electronic horizon over a vehicle bus to one or more ADAS applications of the vehicle for use by one or more ADAS applications in controlling one or more vehicle subsystems of the vehicle.

14. The computer-readable medium of claim 13, wherein the one or more ADAS applications use the data provided over the vehicle bus to carry out one or more of: issuing a speed warning, providing a speed recommendation, and automatically controlling the braking function of the vehicle.

15. An apparatus for generating and using an electronic horizon for use with an advanced driver assistance system (ADAS) of a vehicle, comprising at least one processor and a memory, wherein the at least one processor is arranged to:
   obtain positional data relating to the movements of a device associated with a vehicle with respect to time on a road network;
   use the positional data to record data indicative of the paths taken by the vehicle through a plurality of decision points of the road network in a memory;
   use the recorded data for a decision point to generate the electronic horizon, wherein the electronic horizon defines at least a most probable outgoing path from the decision point to be taken by the vehicle when confronted with the decision point; and provide data to the ADAS of the vehicle determined using the electronic horizon to provide assistance to a driver of the vehicle.

16. The apparatus of claim 15, wherein the use of the recorded data for a decision point to generate the electronic horizon comprises determining data indicative of a relative probability that each of a plurality of possible outgoing paths associated with the decision point will be taken by the vehicle using the recorded data for the decision point.

17. The apparatus of claim 16, wherein the at least one processor is further arranged to associate a relatively higher probability of the path being taken with a possible outgoing path that is associated with a relatively higher probability of having been selected based on the recorded data for the decision point.

18. The apparatus of claim 16, wherein the at least one processor is further arranged to store the determined data indicative of the relative probability that each possible outgoing path will be taken, in association with at least one of: data indicative of the path to which the probability data relates; and the decision point to which it relates.

19. The apparatus of claim 15, wherein the electronic horizon defines the most probably outgoing path and at least one alternative outgoing path to be taken by the vehicle when confronted with the decision point.

20. The apparatus of claim 15, wherein the apparatus is configured to provide the data determined using the generated electronic horizon over a vehicle bus to one or more ADAS applications of the vehicle for use by the one or more ADAS applications in controlling one or more vehicle subsystems of the vehicle.

\* \* \* \* \*